United States Patent [19]

Takahashi et al.

[11] Patent Number: 4,712,629
[45] Date of Patent: Dec. 15, 1987

[54] ENGINE AND DRIVE BELT COOLING SYSTEM FOR AN ALL TERRAIN VEHICLE

[75] Inventors: Ken Takahashi, Hamamatsu; Chiaki Hirata; Yuji Ishioka, both of Kosai, all of Japan

[73] Assignee: Suzuki Motor Company Limited, Japan

[21] Appl. No.: 903,279

[22] Filed: Sep. 3, 1986

[30] Foreign Application Priority Data

Sep. 4, 1985 [JP] Japan ................ 60-195475

[51] Int. Cl.$^4$ ............................ B60K 11/06; F01P 1/02
[52] U.S. Cl. .................... 180/68.1; 123/41.66; 180/217; 180/219; 180/231
[58] Field of Search ............ 180/229, 231, 908, 217, 180/219, 68.1, 68.2, 68.3, 296, 309; 123/41.63, 41.65, 41.66

[56] References Cited

U.S. PATENT DOCUMENTS 4,497,285  2/1985  Kondo ........................ 180/229

FOREIGN PATENT DOCUMENTS 2518684  6/1983  France ...................... 180/229
2519109  7/1983  France ...................... 180/68.1
2114945  9/1983  United Kingdom ........... 180/229

Primary Examiner—John J. Love
Assistant Examiner—Everett G. Diederiks, Jr.
Attorney, Agent, or Firm—McGlew and Tuttle

[57] ABSTRACT

The present invention relates to an improvement in the cooling efficiency of an air cooling and vent device for use with a belt drive type power transmission for an all terrain vehicle, wherein cooling air introduced into a belt drive casing by an air suction fan built integrally with a drive pulley of the transmission is forced out of an air outlet provided in the middle position between the drive pulley and a driven pulley to the atmosphere by the suction effect of a cooling fan of the engine.

3 Claims, 4 Drawing Figures

ENGINE AND DRIVE BELT COOLING SYSTEM FOR AN ALL TERRAIN VEHICLE

BACKGROUND OF THE INVENTION (i) Field of the Invention

The present invention relates to a cooling device for the drive system of an automotive vehicle, and more particularly to an improvement in the cooling performance of an air cooling device for use in the belt drive system of an all terrain vehicle, which employes a drive system of belt-driving type.

(ii) Description of the Prior Art

In a relatively light-weight automotive vehicle of specific type adapted in particular to the so-called all-terrain operation, a power transmission system of belt drive type is commonly employed as its drive. This belt-type transmission is generally of such construction that the belt drive mechanism is enclosed fully by a covering or casing for the purpose of protecting the entire drive mechanism from any possible splashing of muddy water or intrusion of dust or other foreign matter, otherwise they may enter into the drive mechanism casing. By the way, from such a fully enclosed structure of the drive mechanism, it is inevitably that a driving V-belt and pulleys incorporated in the drive mechanism which are fully enclosed in the casing may well be subjected to a hazardous effect of heating from the friction driving operation of such members involved. In coping with such an undesired heating effect, it is essential to employ a certain means of cooling-off the resulting heat in these driving members, particularly the drive belt which is rather less resistant to the effect of heat. For this purpose, there have been proposed a variety of cooling means in particular for the belt drive mechanism, such as a forced draft system which is designed to have outside air introduced forcedly into the casing or the belt chamber.

As a typical example of such a forced draft cooling system, such a construction is generally known that there are provided an air inlet and an outlet in the front and rear ends of the casing of the belt drive mechanism, respectively, and a suction fan built integrally with a drive pulley is adapted to have outside air introduced into the casing of the drive mechanism through the air inlet, while letting hot air existing within the belt chamber out thereof through the outlet.

On the other hand, referring further to the general construction of such cooling device, it is known that the configurations of the air inlet and outlet provided in the casing of drive mechanism is getting more complicated in an attempt to hamper possible entrance of dirty water or the like through these inlet and outlet structure in the casing. Particularly, in the operation of the all-terrain vehicle, it is very possible that such air inlet and outlet might come under the level of water while running through shallows and muddy lands. In consideration of such a possible operating condition, it is the common practice in the design of such draft system that there is provided a certain length of piping extending upwardly from the air inlet and outlet portions for the protection of the belt drive mechanism within the enclosure from the intrusion of foreign matter into the casing. With such construction, it is naturally inevitable that there is produced a substantial resistance against the passage of cooling air to be introduced into the casing for vent, thus making it impracticable that the effect of suction generated from the suction fan may eventually satisfy the requirement of cooling upon the V-belt and the like members involved in the drive mechanism of the vehicle, after all.

In consideration of such drawbacks particular to the conventional construction of air cooling systems for use with the belt drive mechanism for an all-terrain vehicle as noted above, it would be desirable to attain an efficient resolution for overcoming such inevitable problems particalur to the conventional construction.

The present invention is essentially directed to the provision of a due and proper resolution to such inconveniences and difficulties in practice as outlined above and experienced in the conventional air cooling systems which have been left unattended with any proper countermeasures therefor.

SUMMARY OF THE INVENTION

It is therefore a primary object of the present invention to provide an improvement in the construction of an air cooling device for use with an all terrain vehicle wherein there may be provided a sufficient introduction of cooling air into the belt drive chamber of a drive mechanism for the vehicle with the provision of a simple structure and without the addition of any relative elements such as a suction fan or the like in the drive mechanism at all.

The above object of the invention can be attained efficiently from an improved air cooling device for use with a belt drive type power transmission including a drive pulley means mounted securely on a crank shaft of an internal combustion engine of forced-air cooling type, with an engine cooling fan means disposed on one and the same crank shaft, a driven pulley means mounted on a driven shaft means, and a drive belt means extending operatively across the drive and driven pulley means; wherein as summarized in brief, the drive and driven pulley means and the drive belt means are enclosed hermetically within a casing means, comprising in combination an air suction fan means mounted integrally with the drive pulley means, a first suction duct means adapted to introduce outside air into the side of suction or negative pressure generated by the air suction fan means and connected operatively to the casing means, the casing means having an air outlet means defined in the middle position between the drive pulley means and the driven pulley means, and a communicating pipe means adapted to operatively connect the air outlet means to the suction side of the engine cooling fan means.

As summarized above, by virtue of the advantageous construction of the present invention such that there is obtained a substantial effect of introducing outside air through the front end portion of a casing or enclosure of the belt drive mechanism of a vehicle including a drive pulley, a driven pulley and a drive belt, by function of an air suction fan built in integrity with the drive pulley, and that air existing within the casing is directed forcedly by the suction of an engine cooling fan out through an air outlet provided in the middle of the drive pulley and the driven pulley, a substantially more quantity of air may be introduced into the casing than in the conventional vent construction, thus making it practicable that the drive elements such as the pulleys and drive belt may be cooled more effectively. As a consequence, there may be attained an advantageous effect of providing a stable power transmission from the belt drive system, accordingly.

In addition, by virtue of the provision of the air outlet in the middle of the drive pulley and the driven pulley of the drive mechanism, it is not possible in practice that the distance of passage of the cooling air within the casing may be made shorter than in the conventional construction, thus minimizing contact by the cooling air with the portions that need not be cooled, so much so that there is attained a more effect of cooling upon the pulleys and drive belt, and thus making the exhaust air temperature substantially lower at the outlet, which may naturally contribute to an ease in the heat-resisting measures to be rendered on the part of the air outlet and an communicating pipe involved in the system.

Moreover, by virtue of the provision of a communication pipe which interconnects the air outlet to the air suction side of the engine cooling fan, there is attained an ensured means to prevent the entrance of water at the outlet as encounteed in the running operation through the shallows, etc., and also this advantageous effect may be attained with a relatively short extension of the communicating pipe, thus minimizing the increase in weight or in cost of the system, accordingly.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated at like reference numerals.

DETAILED DESCRIPTION OF THE INVENTION

Figure 1:
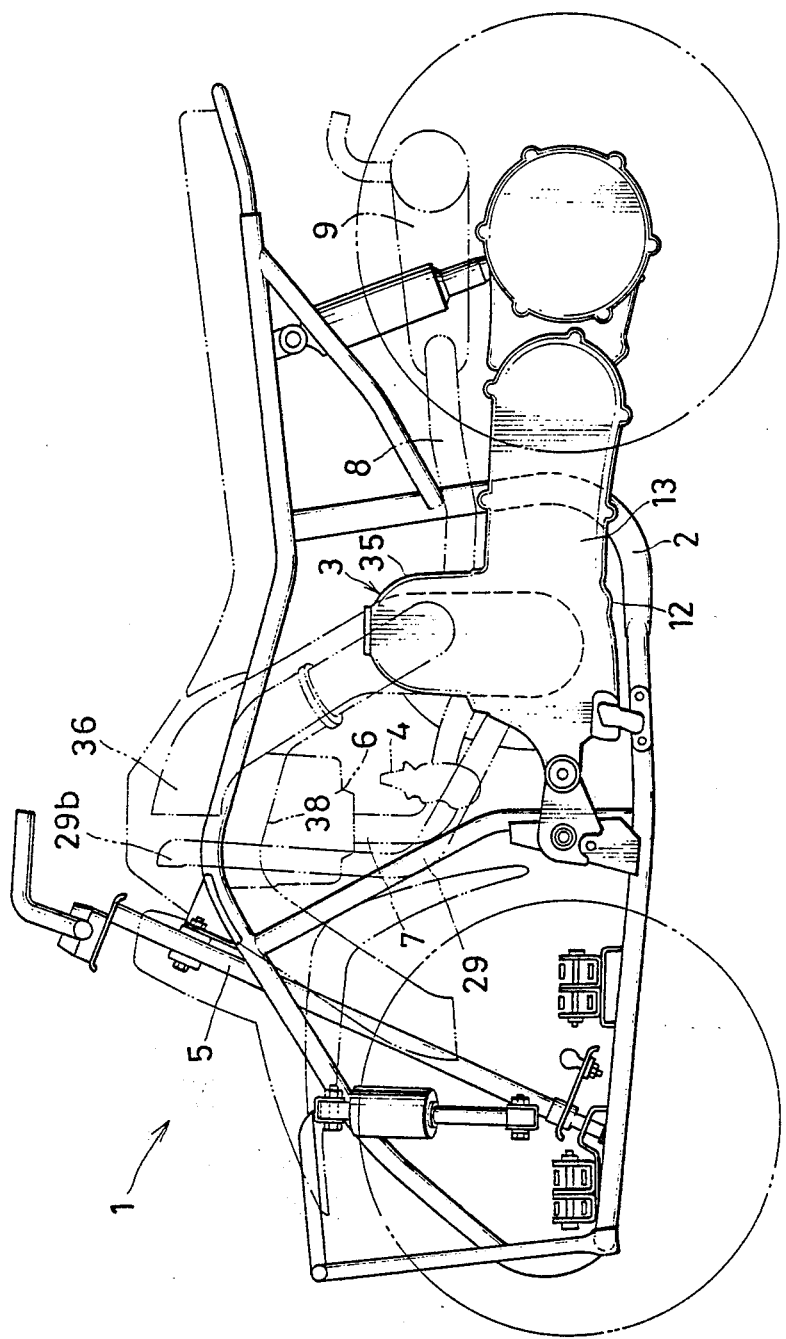
FIG. 1 is a side elevational view showing the general construction of a main frame of an all terrain vehicle by way of a preferred embodiment of the present invention.

The present invention will now be explained in detail by way of a preferred embodiment thereof in conjunction with accompanying drawings herewith. Referring firstly to FIG. 1, there is shown schematically the general construction of a main frame designated at the reference numeral 2 of an all terrain vehicle 1, in the middle of which main frame there is seen mounted an engine of forced-air cooling type 3. Also, there are provided a carburettor 4 in the front of the engine 3 and an air cleaner 6 near a steering head 5 in the upper front of the carburettor 4. It is also seen that the carburettor 4 and the air cleaner 6 are connected with each other by way of a second suction duct 7. On the other hand, there is seen connected an exhaust pipe 8 to the engine 3 in the rear part thereof, this exhaust pipe 8 extending rearwardly along the main frame, and there if mounted a silencer or muffler 9 at the rear end of the exhaust piping.

By virtue of such arrangement that the air suction system including the carburettor and the air cleaner on the front side of the engine, and the exhaust pipe in the rear of the engine as stated above, it is not necessary to have the exhaust piping bent U-turn as otherwise mounted in the front of the engine, thus leaving a substantial space ahead the engine which can be made available to the installation of a first suction duct for cooling the belt chamber of a belt drive mechanism of a vehicle and a third suction duct for cooling the engine, respectively, as stated further later. This piping layout is ideal particularly in view of the protection against possible intrusion of water or other foreign matter into the drive mechanism. In addition, this piping arrangement can provide a shortest possible extension of duct, which can of course contribute to the reduction in weight and total production cost of the vehicle.

Figure 2:
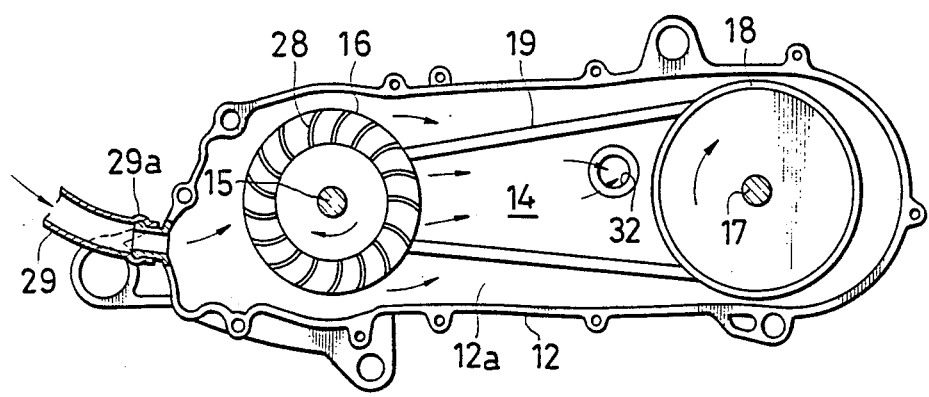
FIG. 2 is a side elevational view showing the general arrangement of the drive mechanism in a crank case with a cover removed.
Figure 3:
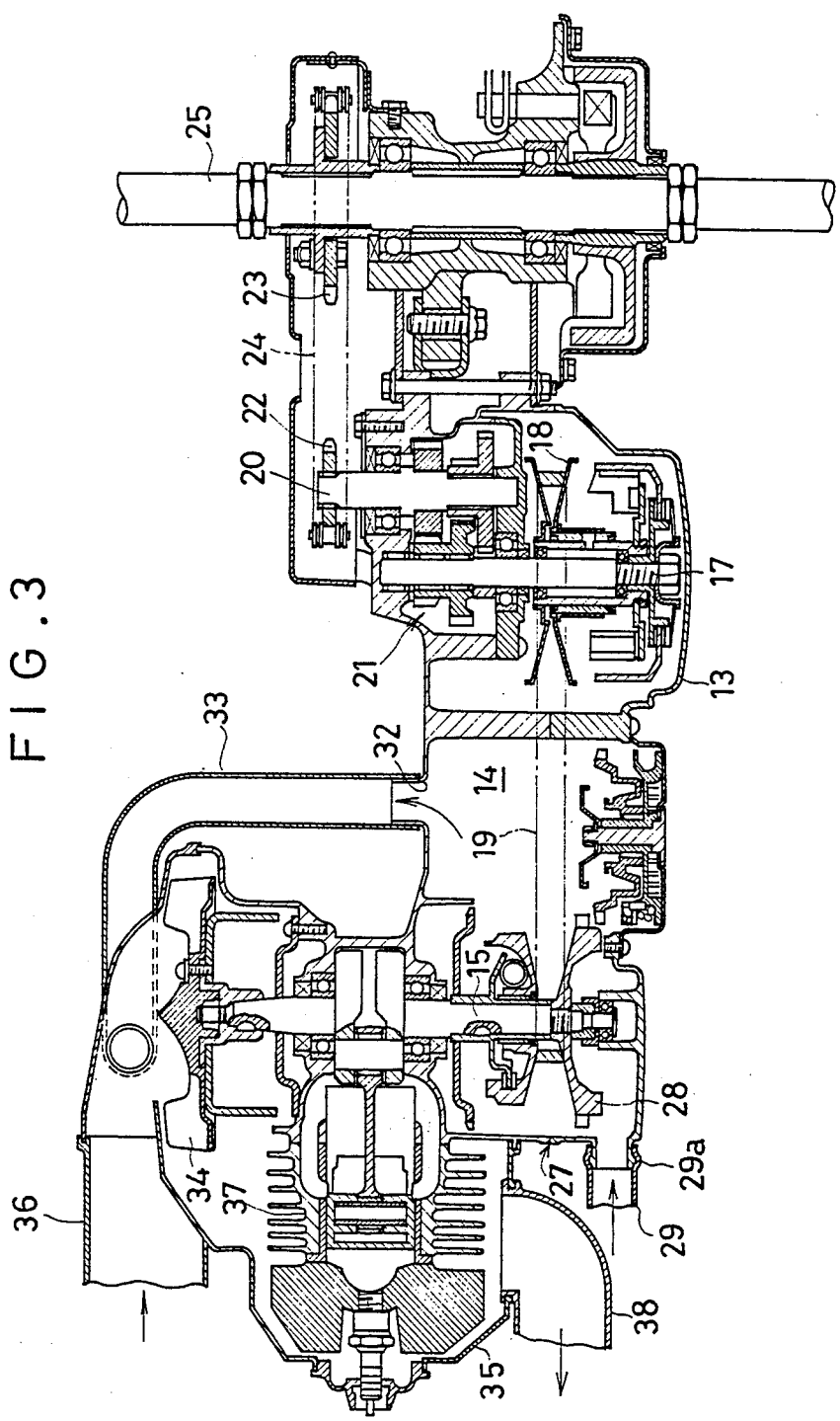
FIG. 3 is a cross-sectional view taken along the horizontal plane showing the crank case of the invention.

More specifically, there is installed a belt drive casing 12 on one lateral side of the engine, which casing is covered with a side cover 13 and in which casing there is defined a belt chamber 14, as shown in FIGS. 2 and 3. In this belt chamber 14, there are operatively disposed a driving pulley 16 mounted on a engine crank shaft 15, a driven pulley 18 mounted on a first driven shaft 17, respectively, and these driving and driven pulleys 16, 18 are seen interconnected with each other by way of a V-shaped drive belt 19 extending therebetween. These pulleys 16, 18 are of variable-diameter type, which provides an automatic power transmission adapted to change a speed in response to change in revolutionary number of the engine crank shaft 15 or the first driven shaft 17.

In the rear end of the crank case 12, there is further mounted a second driven shaft 20, and the output power from the first driven shaft 17 is transmitted to this second driven shaft 20 through reduction gears 21, and then from the second driven shaft 20 to a rear wheel 25 by way of a sprockets 22, 23 and a drive chain 24.

As shown more specifically in FIG. 3, as these pulleys 16, 18 and the V-belt 19 are housed or enclosed in the inside of the casing proper 27, which comprises a side wall portion 12a of the crank case 18 and the side cover 13, they can be protected fully from a splashing of muddy water or intrusion of dust and other foreign matter.

Figure 4:
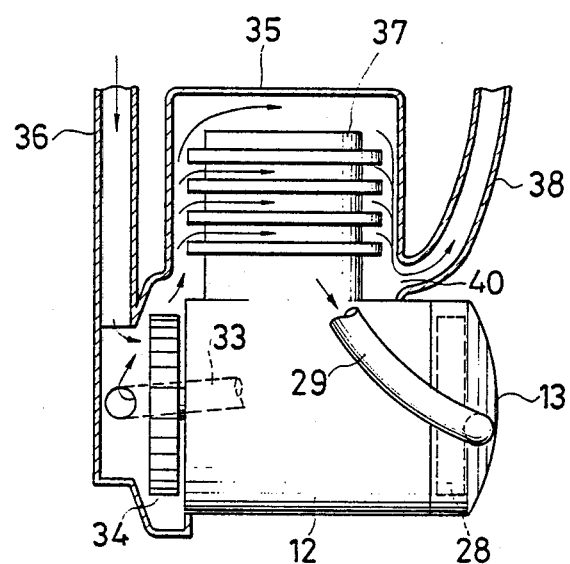
FIG. 4 is a transversal cross-sectional view showing the general arrangement of an engine and power transmission unit according to the invention.

Also, there is seen provided an air suction fan 28 integrally upon the lateral face of the driving pulley 16, as shown FIGS. 2 through 4. On the suction side under a negative pressure produced by this suction fan 28, there is disposed the leading end 29a of a first suction duct 29 which is inserted from the front end of the belt chamber 14. On the other hand, the opposite end 29b of this first suction duct 29 is seen extending upwardly to a relatively high position in the front of the engine 3 and fixed in position ahead the air cleaner 20, where it opens to the atmosphere, as shown in FIG. 1.

With this arrangement, when the drive pulley 16 runs in rotation, outside air is now introduced into the belt chamber 14 by way of the first sucion duct 29.

On the other hand, referring further to the vent mechanism according to the invention, there is provided an air outlet 32 in the side wall portion 12a of the crank case 12 forming the casing complete 27, generally in the middle point between the drive pulley 16 and the driven pulley 18 as typically shown in FIGS. 2 and 3 (seen in a position slightly close to the driven pulley 18 in the illustration). In particular, this air outlet 32 is connected to the upstream or air intake side of an engine cooling fan 34 by way of a communicating pipe 33, as shown in FIGS. 3 and 4. The engine cooling fan 34 is seen mounted on one end of the engine crank shaft 15 to provide a forced-air cooling effect for the area within a cylinder cover 35 from this fan 34 when the engine 3 operates, as shown in FIG. 4. On the air suction side of the fan 34, there is provided a third air suction duct 36 extending forwardly to a high point, which is specifically arranged in view of the prevention of water from intruding into the engine cooling area. In addition, there is another exhaust duct 38 connected to the engine cylinder cover 35. This exhaust duct 38 extends rising forwardly once for the prevention of water intrusion and then bent downwardly along the steering head 5, as tyically shown in FIG. 1.

With this arrangement of air cooling and vent system according to the invention, in operation, when the engine 3 starts and the crank shaft 15 runs in rotation, the output power of the crank shaft is now transmitted from the drive pulley 16 to the driven pulley 18 through the V-belt 19. When the drive pulley 16 rotates, the air suction fan 28 built integrally therewith may run together so that fresh outside air is introduced into the belt chamber 14 by way of the first suction duct 29 under the suction effect produced by this suction fan 28. On the other hand, air existing in the inside of the belt chamber 14 is sucked under a negative pressure effected by the engine cooling fan 34 on route of the communicating pipe 33. By virtue of such combined effect of air introduction and suction by way of this independent venting system of the present invention, there can be attained a more positive effect of introduction of outside air into the belt chamber 14 than in the conventional construction, thus making available an efficient cooling effect upon the pulleys 16, 18 and the V-belt 19, and thus preventing a possible loss in the tranmitting torque in the drive mechanism, accordingly.

On the other hand, reviewing more specifically the air intake system of the engine, fresh air through the air cleaner 6 is taken into the the carburettor 4 by way of the air suction duct 7. Since the air cleaner 6 is mounted at a high point on the main frame 2 of the vehicle, there is a less chance for water to enter into the opening of the air cleaner, while running through the shallows or muddy land. Also, the leading end portion 29b of the first suction duct 29 is placed at a high level, there is attained the like effect of preventing water from intruding into the belt chamber 14. As the exhaust pipe 8 is mounted extending in the rear of the engine 3 along the main frame of the vehicle, there is no possibility that the first, the second and the third suction ducts 29, 7, 36 are subjected to any heat radiated from the exhaust pipe 8, accordingly.

Referring to the route of cooling air passage for the belt drive mechanism, air after having cooled off the drive members such as the pulleys 16, 18 and the V-belt 19 while passing therethrough gets warmer, and is directed out of the air outlet 32 of the casing proper 27 through the communicating pipe 33, and then the air is sucked into the negative pressure side of the engine cooling fan 34, where it is put to be mixed with fresh air taken into the third suction duct 36, thereafter it being forced into the inside area of the cylinder cover 35 by the engine cooling fan 34. Then, air having cooled off the engine cylinder 37 is now redirected into the exhaust duct 38 through an opening 40 provided in the lower bottom of the cylinder cover 35, from which exhaust duct it is discharged outwardly. Since the heat capacity of the driving members such as the V-belt 19 required to be cooled down is relatively small, there is no appreciable affection upon the cooling effect of the cylinder 37 provided from the engine cooling fan.

According to the specific feature of the present invention, the air outlet 32 is located not in the rear end portion of the casing proper 27 but in the middle point between the drive pulley 16 and the driven pulley 18, the distance of passage of cooling air within the belt chamber 14, that is, the distance from the end portion 29a of the first suction duct 29 to the outlet 32 is consequently substantially shorter than in the conventional construction. With this arrangement, there is minimized the possibility of contact by the cooling air with the portions not required to be cooled off such as the crank case side wall 12a and the side cover 13, the driving members such as the V-belt and the like which are to be cooled can then be cooled to a greatest extent. In addition, since there may be introduced a much greater quantity of air into the belt chamber 14 then in the conventional construction, it is feasible in practice that the temperature of cooling air within the belt chamber 14 which is to be exhausted out of the outlet 32 can now be made much lower than that available in the conventional arrangement, thus easing the burden of heat resistance arrangement to be rendered on the part of the communicating pipe 33 or the like, accordingly.

In the case like in the typical conventional arrangement that there is provided the air outlet 32 at the rear end portion of the casing proper 27, it would be difficult to mount an extension of pipe extending upwardly at the outlet 32 for the prevention of water intrusion as the arrangement of other parts around the outlet 32 may possibly hamper the installation of the connecting pipe, and besides, the installation of such pipe is not desirable for the sake of external appearance, if so installed. In contrast, according to the advantageous arrangement of the air cooling and vent system of the invention, the air outlet 32 is positioned generally in the middle of the casing proper 27, and this outlet is located on the side facing the crank case side wall 12a and not seen from the outside. In addition, there is provided the communicating pipe 33 having a relatively short length and extending generally in the horizontal direction from the air outlet 32 to the upstream of the engine cooling fan 34. With this advantageous configuration of piping, therefore, it is easy to arrange this communicating pipe 33 in due position, there is attained an acceptable appearance, and above all, there is attained a positive effect of preventing water or other contaminants from intruding into the belt chamber. Incidentially, when adapting the present invention to a motorcycle, it is also practicable that the communicating pipe 33 may extend rearwardly avoiding the rear wheel arrangement.

While the invention is described by way of a specific embodiment thereof, it is to be understood that the invention may be embodied in various ways without being restricted to this specific embodiment thereof, but many other modifications may be made without departing from the spirit of the invention. For instance, while the air outlet 32 is provided on the side 12a of the casing proper 27 facing the crank case of the engine, it may of course be located on the side cover 13 to an equal advantageous effect in accordance with the foregoing teachings of the invention. Also, the arrangement of the communicating pipe 33 may be put to practice in any other ways as suiting the detail of an actual frame structure or arrangement of parts of a vehicle which may differ from one to the other.

It is also to be understood that the appended claims are intended to cover all of such generic and specific features particular to the invention as disclosed herein and all statements relating to the scope of the invention, which as a matter of language might be said to fall thereunder.

What is claimed is:

1. An all terrain vehicle having a belt driven type power transmission including a drive pulley means mounted securely on a crank shaft of an internal combustion engine of forced-air cooling type, an engine cooling fan means having an air intake suction side, said engine cooling fan means also being securely mounted on said crank shaft, a driven pulley means mounted on a driven shaft means, and a drive belt means extending operatively across said drive and driven pulley means; wherein said driven and driven pulley means and said drive belt means are enclosed hermetically within a casing means, comprising in combination an air suction fan means mounted integrally with said drive pulley means, a first suction duct means adapted to introduce outside air into the side of suction or negative pressure generated by said air suction fan means and connected operatively to said casing means, said casing means having an air outlet means located intermediate said drive pulley means and said driven pulley means, and a communicating pipe means operatively connecting said air outlet means to said suction side of said engine cooling fan means.

2. An all terrain vehicle as claimed in claim 1, wherein said forced-air cooled engine is mounted substantially in the middle position of a main frame of the vehicle, having a carburettor means disposed in front of said engine, and an air cleaner means disposed in the upper front of said carburettor means, and having a second suction duct means adapted to connect operatively said carburettor means and said air cleaner means with each other, and wherein said first suction duct means is connected operatively to a front end portion of said casing means and extends upwardly in front of said engine, said vehicle including an exhaust pipe means extending rearwardly from a rear portion of said engine.

3. An all terrain vehicle as claimed in claim 2, wherein a third suction duct means is connected operatively to said suction side of said engine cooling fan means and extends upwardly in front of said engine.

* * * * *